(12) United States Patent
Dowd et al.

(10) Patent No.: US 9,815,487 B2
(45) Date of Patent: Nov. 14, 2017

(54) COMPACT FOLDABLE STROLLER WITH ONE-HANDED FOLD CONTROL

(71) Applicant: Dorel Juvenile Group, Inc., Foxboro, MA (US)

(72) Inventors: Paul Dowd, Scarsdale, NY (US); Christopher D. Miller, Bronxville, NY (US); Joseph F. Brewin, Franklin, MA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 15/388,268

(22) Filed: Dec. 22, 2016

(65) Prior Publication Data

US 2017/0166234 A1   Jun. 15, 2017

Related U.S. Application Data

(63) Continuation of application No. 14/594,399, filed on Jan. 12, 2015, now Pat. No. 9,561,816.

(60) Provisional application No. 61/926,078, filed on Jan. 10, 2014.

(51) Int. Cl.
*B62B 7/10* (2006.01)
*B62B 7/08* (2006.01)

(52) U.S. Cl.
CPC ..................... *B62B 7/08* (2013.01)

(58) Field of Classification Search
CPC .................. B62B 7/10; B62B 7/105
USPC ....................... 280/642, 647, 650
See application file for complete search history.

(56) References Cited

U.S. PATENT DOCUMENTS

| | | |
|---|---|---|
| 400,478 A | 4/1889 | Paine |
| 583,719 A | 6/1897 | Wilhelm et al. |
| 585,336 A | 6/1897 | Foss |
| 585,337 A | 6/1897 | Gessler |
| 585,338 A | 6/1897 | Gutiirie |
| 593,007 A | 11/1897 | Bean |
| 601,467 A | 3/1898 | Heise |
| 602,819 A | 4/1898 | William |
| 608,254 A | 8/1898 | Eisenmann |
| 614,541 A | 11/1898 | Fischer |
| 615,461 A | 12/1898 | Peirce |
| 617,239 A | 1/1899 | Eastman |
| 667,760 A | 2/1901 | Benton |
| 5,988,670 A | 11/1999 | Song et al. |
| 6,068,284 A | 5/2000 | Kakuda |
| 6,095,548 A * | 8/2000 | Baechler .............. B62B 7/062 280/642 |
| 6,102,431 A * | 8/2000 | Sutherland ........... B62B 7/062 280/47.17 |
| 6,155,740 A | 12/2000 | Hartenstine |
| 6,766,930 B2 | 7/2004 | Dixon et al. |

(Continued)

FOREIGN PATENT DOCUMENTS

| | | |
|---|---|---|
| CA | 2357334 A1 | 7/2002 |
| CA | 2367260 A1 | 7/2002 |

(Continued)

*Primary Examiner* — Jeffrey J Restifo
(74) *Attorney, Agent, or Firm* — Barnes & Thornburg LLP

(57) ABSTRACT

A compact collapsible stroller in accordance with the present disclosure includes a mobile cart and a seat coupled to the mobile cart. The mobile cart includes a rolling base and a foldable frame that fold inwardly and outwardly from the rolling base.

17 Claims, 8 Drawing Sheets

(56) References Cited

U.S. PATENT DOCUMENTS

| | | | |
|---|---|---|---|
| 6,827,365 B2 | 12/2004 | Yeh | |
| 6,877,760 B2 | 4/2005 | Wang | |
| 6,910,708 B2 | 6/2005 | Sack et al. | |
| 6,921,102 B2 | 7/2005 | Hsia | |
| 7,021,650 B2 | 4/2006 | Chen | |
| 7,422,230 B2 | 9/2008 | Chuan | |
| 7,510,208 B1 | 3/2009 | Lochmueller | |
| 7,543,840 B2 * | 6/2009 | Lin | B62B 3/02 280/38 |
| 7,658,399 B2 | 2/2010 | Van Dijk | |
| 7,832,756 B2 | 11/2010 | Storm | |
| 8,033,555 B2 | 10/2011 | Mostert et al. | |
| 8,066,300 B2 * | 11/2011 | Ohnishi | B62B 7/08 280/47.25 |
| 8,087,689 B2 * | 1/2012 | Fritz | B62B 7/062 280/647 |
| 8,191,919 B2 * | 6/2012 | Wang | B62B 7/08 280/642 |
| 8,215,661 B2 | 7/2012 | Van Dijk | |
| 8,322,744 B2 * | 12/2012 | Ahnert | B62B 9/20 280/47.4 |
| 8,496,263 B2 | 7/2013 | Wu et al. | |
| 8,628,109 B2 | 1/2014 | Daley et al. | |
| 8,696,015 B2 * | 4/2014 | Karremans | B62B 7/062 280/642 |
| 8,783,708 B2 | 7/2014 | Storm et al. | |
| 8,789,843 B2 | 7/2014 | Pearce | |
| 8,844,960 B2 | 9/2014 | Young et al. | |
| 8,870,213 B1 * | 10/2014 | Xu | B62B 7/08 280/642 |
| 8,936,267 B2 | 1/2015 | Li et al. | |
| 8,985,616 B1 * | 3/2015 | Chen | B62B 7/062 280/47.38 |
| 8,991,854 B2 * | 3/2015 | Greger | B62B 7/08 280/650 |
| 9,085,312 B2 * | 7/2015 | Liu | B62B 7/08 |
| 9,193,373 B2 * | 11/2015 | Fjelland | B62B 7/08 |
| 9,315,205 B2 * | 4/2016 | Chuah | B62B 7/062 |
| 9,561,816 B2 * | 2/2017 | Dowd | B62B 7/08 |
| 2002/0093157 A1 | 7/2002 | Turner et al. | |
| 2002/0093158 A1 | 7/2002 | Turner et al. | |
| 2002/0093159 A1 | 7/2002 | Turner et al. | |
| 2002/0093160 A1 | 7/2002 | Mendenhall | |
| 2002/0093178 A1 | 7/2002 | Turner et al. | |
| 2002/0109321 A1 | 8/2002 | Turner et al. | |
| 2003/0218306 A1 | 11/2003 | Dixon et al. | |
| 2005/0098981 A1 | 5/2005 | Chang | |
| 2006/0071451 A1 * | 4/2006 | Cheng | B62B 7/008 280/642 |
| 2006/0082104 A1 * | 4/2006 | Wun | B62B 7/062 280/650 |
| 2009/0115151 A1 | 5/2009 | Van Dijk | |
| 2009/0121454 A1 * | 5/2009 | Tomasi | B62B 7/08 280/642 |
| 2009/0256406 A1 | 10/2009 | Schrooten | |
| 2010/0127480 A1 * | 5/2010 | Ahnert | B62B 7/08 280/647 |
| 2011/0012325 A1 * | 1/2011 | Gower | B62B 7/008 280/648 |
| 2012/0025491 A1 * | 2/2012 | Li | B62B 7/083 280/642 |
| 2012/0049485 A1 * | 3/2012 | Lin | B62B 7/068 280/647 |
| 2012/0056408 A1 | 3/2012 | Wu et al. | |
| 2012/0086187 A1 | 4/2012 | Daley et al. | |
| 2012/0187660 A1 * | 7/2012 | Liao | B62B 7/086 280/642 |
| 2012/0292888 A1 * | 11/2012 | Lai | B62B 7/086 280/650 |
| 2013/0113186 A1 * | 5/2013 | Rembisz | B62B 7/06 280/647 |
| 2014/0327233 A1 * | 11/2014 | Greger | B62B 7/08 280/650 |
| 2014/0339793 A1 * | 11/2014 | Xu | B62B 7/08 280/650 |
| 2014/0339794 A1 | 11/2014 | Pearce | |
| 2015/0008659 A1 * | 1/2015 | Chang | B62B 7/08 280/650 |
| 2015/0197268 A1 * | 7/2015 | Dowd | B62B 7/08 280/650 |
| 2015/0321689 A1 * | 11/2015 | Liu | B62B 7/08 280/650 |

FOREIGN PATENT DOCUMENTS

| | | |
|---|---|---|
| CA | 2367263 A1 | 7/2002 |
| CA | 2367545 A1 | 7/2002 |
| CA | 2367558 A1 | 7/2002 |
| CA | 2367580 A1 | 7/2002 |

* cited by examiner

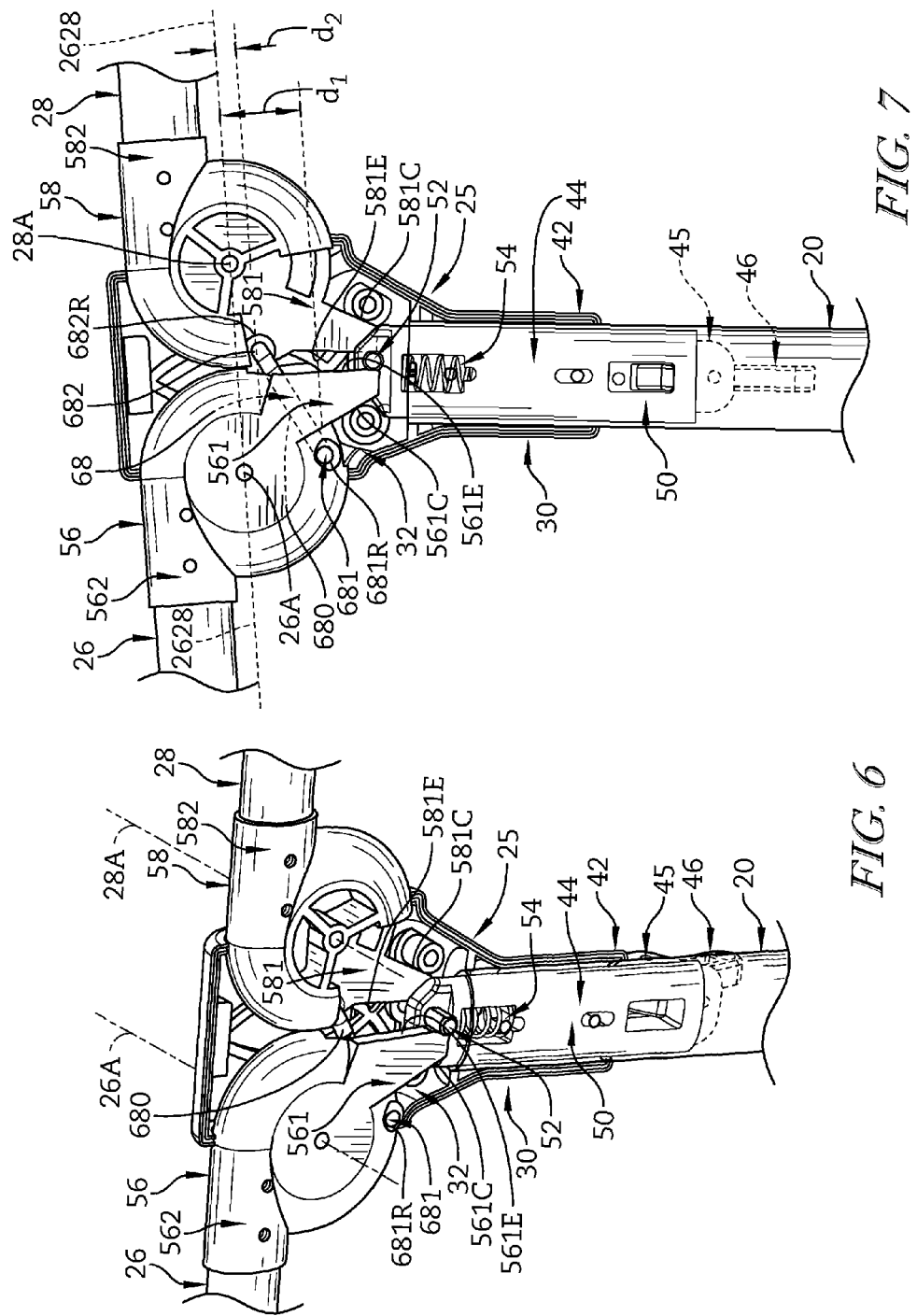

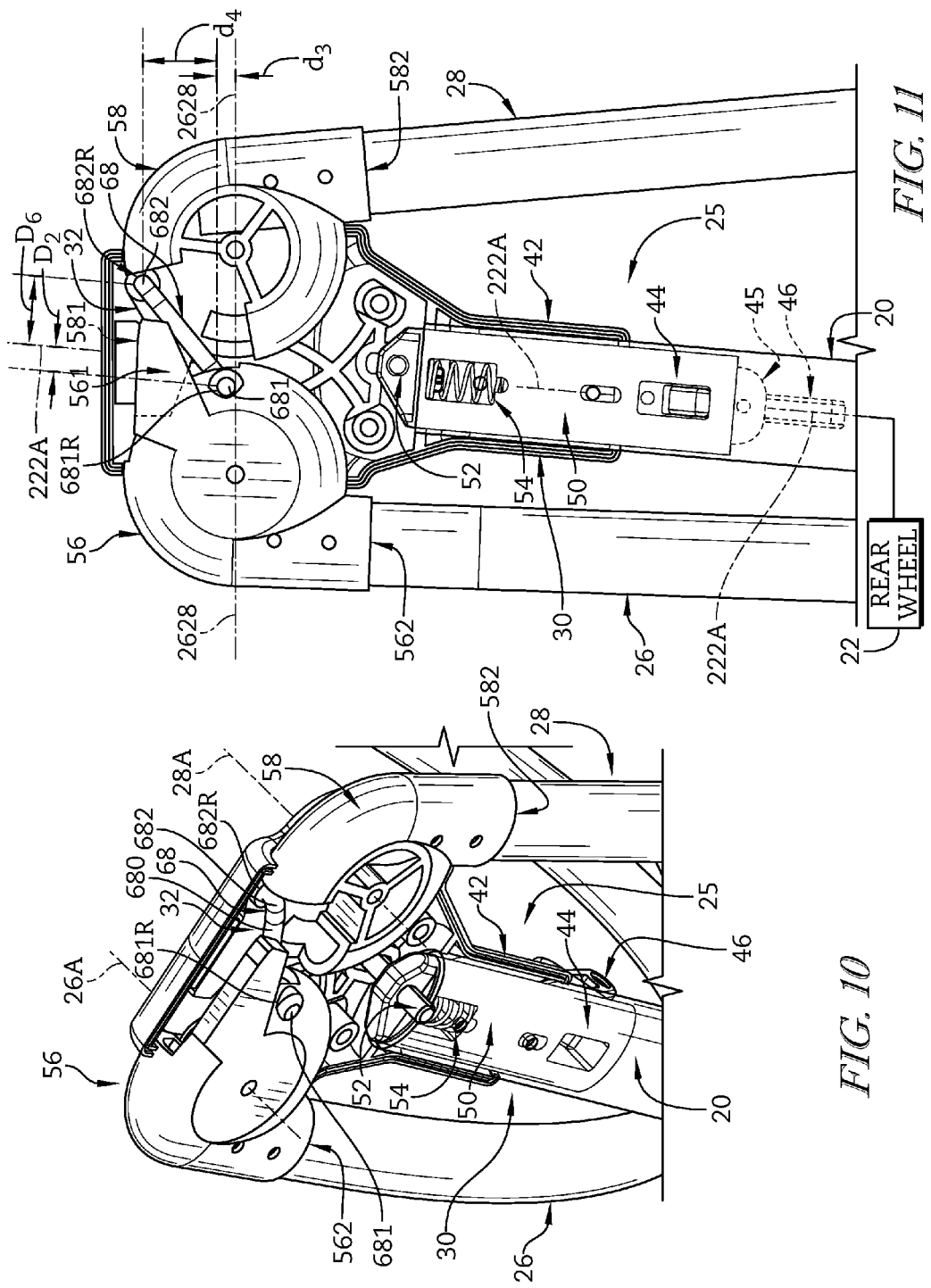

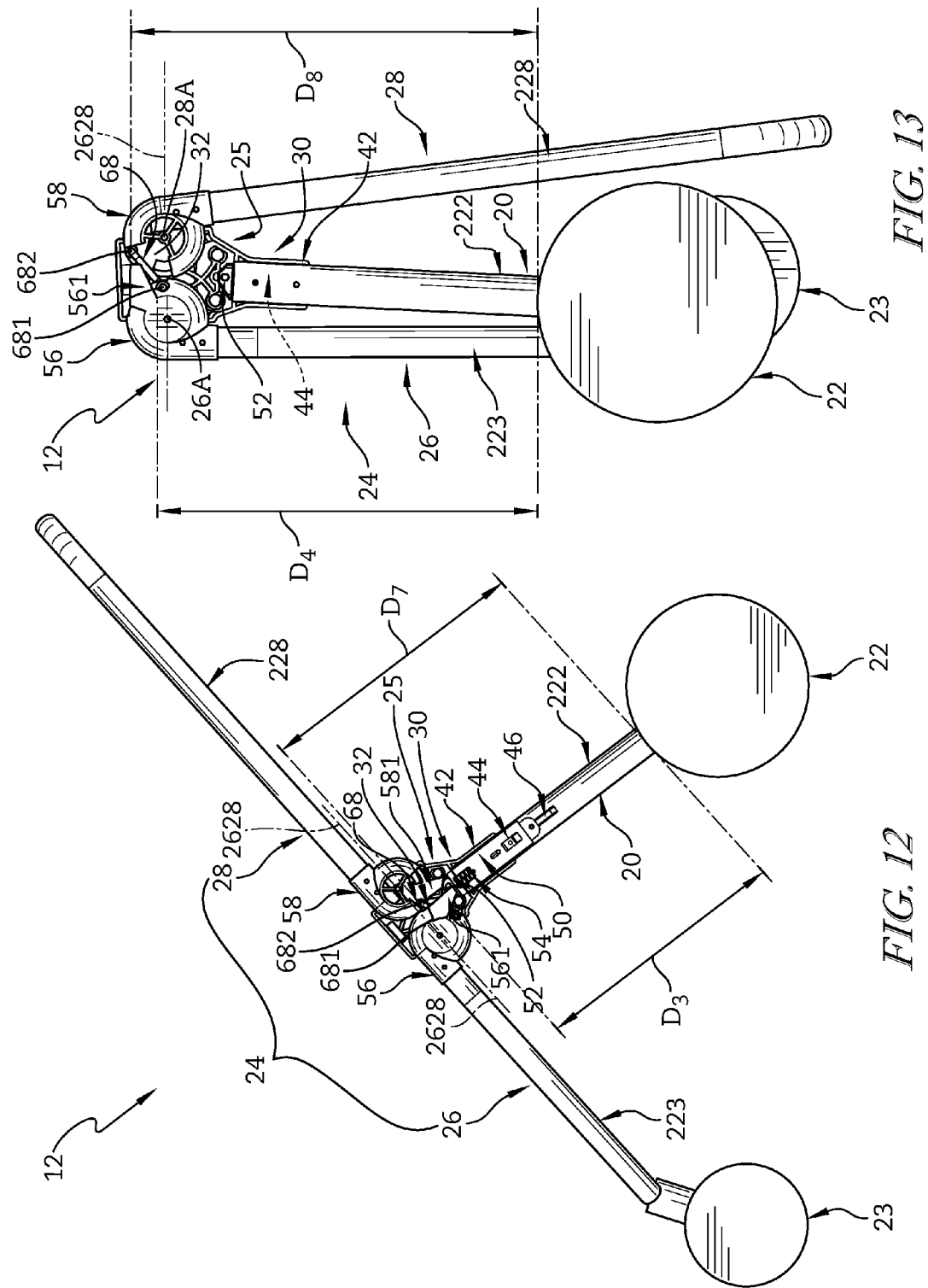

COMPACT FOLDABLE STROLLER WITH ONE-HANDED FOLD CONTROL

PRIORITY CLAIM

This application is a continuation of U.S. application Ser. No. 14/594,399, filed Jan. 12, 2015, which claims priority under 35 U.S.C. §119(e) to U.S. Provisional Application No. 61/926,078, filed Jan. 10, 2014, which applications are expressly incorporated by reference herein.

BACKGROUND

The present disclosure relates to collapsible strollers for juveniles, and particularly to strollers including a collapsible frame assembly, a seat, and several wheels. More particularly, the present disclosure relates to collapsible frame assemblies for juvenile strollers.

Juvenile strollers are used widely to transport young children. Foldable strollers including collapsible frame assemblies that can be placed in vehicle trunks or storage areas. Caregivers appreciate compact foldable strollers that are easy to fold and that do not require a lot of storage space so that space is available onboard a vehicle or elsewhere for storage of other items.

SUMMARY

A compact collapsible stroller in accordance with the present disclosure includes a mobile cart and a seat coupled to the mobile cart. The mobile cart includes a foldable frame that supports the seat.

In illustrative embodiments, the mobile cart of the stroller comprises a rolling base, a foldable frame mounted on the rolling base, and a frame-motion controller adapted to control movement of the foldable frame relative to the rolling base. The foldable frame includes a base stabilizer having a front wheel and a base pusher having a push handle each coupled to the rolling base to pivot about respective pivot axes. The frame-motion controller includes a pivot lock with a fold handle for freeing the foldable frame components to fold in and a movement linkage that coordinates movement of the base stabilizer and the base pusher so that they are simultaneously folded-in or folded out relative to the rolling base.

In illustrative embodiments, the foldable frame moves between a folded-out position for supporting a child and a folded-in position for storage of the stroller. The pivot lock of the frame-motion controller operates to block or allow movement of the foldable frame from the folded-out position to the folded-in position. The pivot lock includes left and right locking units and a fold handle that interconnects the locking units. The fold handle extends through the seat and is accessible to a caregiver when a child is not supported in the seat. When a caregiver pulls the fold handle, the pivot lock allows movement of the foldable frame from the folded-out position to the folded-in position.

In illustrative embodiments, each locking unit of the pivot lock includes a housing coupled to the rolling base, a motion blocker mounted in the housing to slide within the housing, and a lever coupled to the fold handle and mounted to the rolling base to pivot when a caregiver pulls the fold handle. The motion blocker slides between a first position arranged to block the components of the foldable frame from pivoting about their respective axes and a second position arranged to allow the components of the foldable frame to pivot about their respective axes. The lever pivots to push the motion blocker to the second position when a user pulls the fold handle.

In illustrative embodiments, the movement linkage of the frame-motion controller includes left and right middle motion-transfer links that couple the base stabilizer and the base pusher. The left and right middle motion-transfer links coordinate movement of the base stabilizer and the base pusher during motion of the foldable frame between the folded-out position and the folded-in position. Each middle motion-transfer link of the movement linkage is pivotably coupled to a stabilizer-link support included in the base stabilizer and to a pusher-link support included in the base pusher. The stabilizer-link support is offset from the pivot axis about which the base stabilizer pivots relative to the rolling base and the pusher-link support is offset from the pivot axis about which the base pusher pivots relative to the rolling base. Each middle motion-transfer link of the movement linkage is illustratively a generally z-shaped rod with ends received in the stabilizer-link support and in the pusher-link support.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 6 is a perspective view of the left lock unit included in the pivot lock of the frame-motion controller corresponding to the mobile cart of FIG. 2 showing the motion blocker of the left lock unit blocking movement of the base stabilizer and the base pusher relative to the rolling base before the motion blocker slides within the housing to allow movement of the base stabilizer and the base pusher as shown in FIGS. 8 and 10;

FIG. 7 is a side elevation view similar to FIG. 6 showing the movement linkage of the frame-motion controller corresponding to the mobile cart of FIG. 2 in which the movement linkage interconnects the base stabilizer and the base pusher to coordinate movement of the base stabilizer and the base pusher during motion of the foldable frame from the folded-out position to the folded-in position as shown in FIGS. 9 and 11;

FIG. 10 is a perspective view of the left lock unit included in the pivot lock of the frame-motion controller corresponding to the mobile cart of FIG. 4 showing the motion blocker of the left lock unit remaining in the unlocked position to allow movement of the base stabilizer and the base pusher relative to the rolling base so that the foldable frame can be moved back to the folded-out position from the folded-in position;

FIG. 11 is a side elevation view similar to FIG. 10 showing the movement linkage of the frame-motion controller corresponding to the mobile cart of FIG. 3 in which the movement linkage interconnects the base stabilizer and the base pusher during motion of the foldable frame to the folded-in position from the folded-out position;

FIG. 12 is a side elevation view of the mobile cart corresponding to the mobile cart of FIG. 2 showing the foldable frame of the mobile cart in the folded-out position and the pivot lock of the frame-motion controller in the locked position blocking movement of the foldable frame to the folded-in position;

FIG. 13 is a side elevation view of the mobile cart corresponding to the mobile cart of FIG. 4 showing the foldable frame of the mobile cart in the folded-in position and the pivot lock of the frame-motion controller in the unlocked position allowing movement of the foldable frame to the folded-out position.

DETAILED DESCRIPTION

Figure 1:
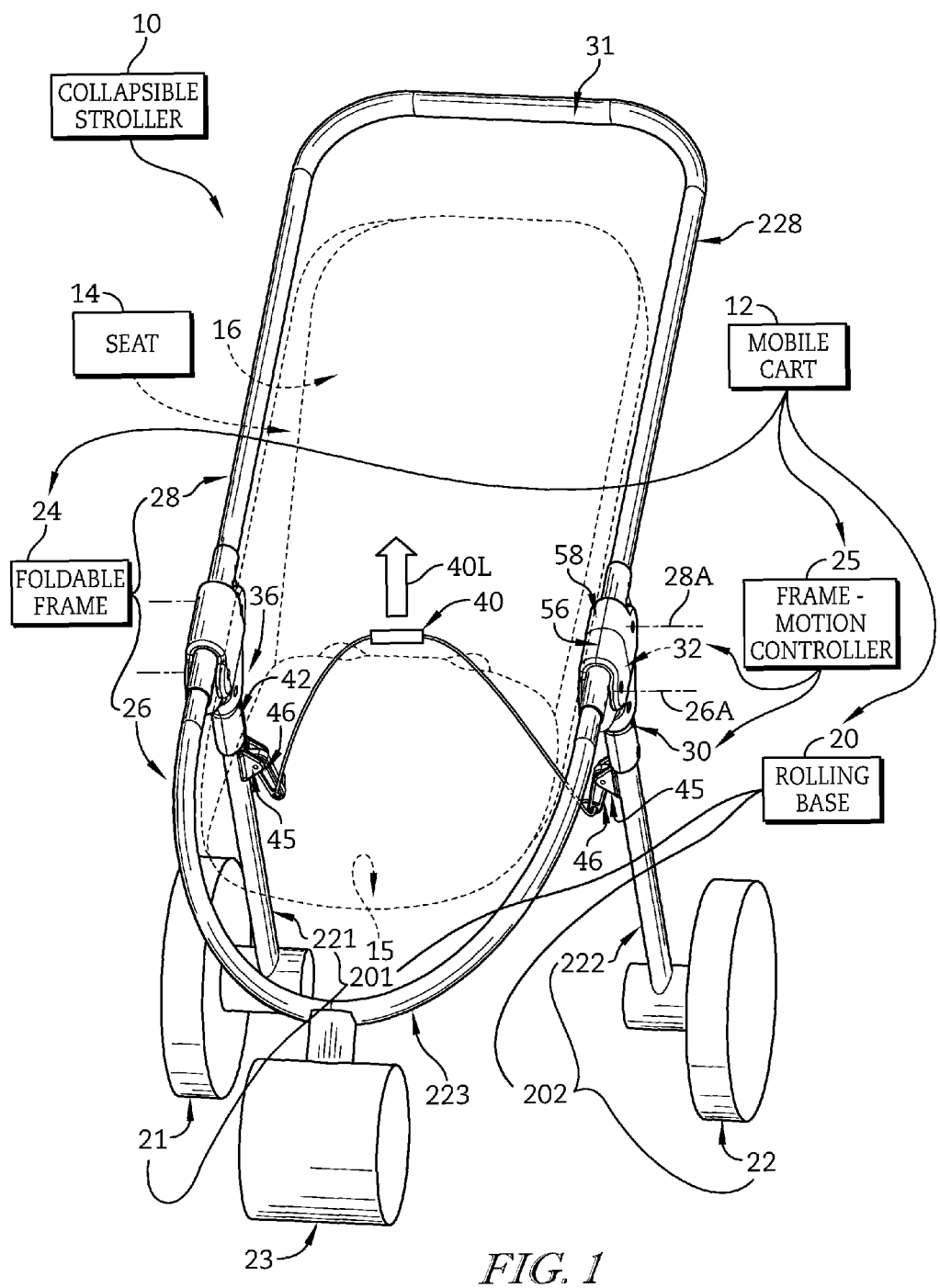
FIG. 1 is a perspective view of a collapsible stroller (with fabric coverings omitted) that is adapted to be reconfigured from an expanded-use mode, shown in FIG. 2, to a collapsed-storage mode, shown in FIG. 4, showing that the stroller includes a mobile cart and a seat (shown in phantom) and showing that the mobile cart includes a rolling base having rear wheels, a foldable frame coupled to the rolling base to provide a base stabilizer with a front wheel and a base pusher with a push handle, and a frame-motion controller adapted to provide one-handed collapsing of the foldable frame in response to a caregiver lifting upwardly on a fold handle that extends through the seat.
Figure 2:
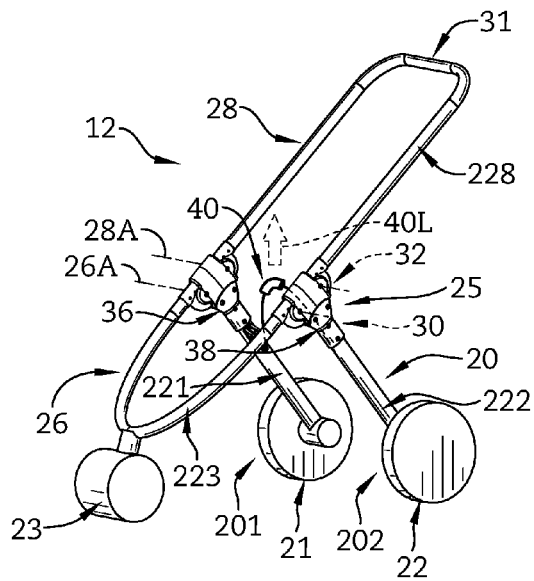
FIG. 2 is a perspective view of the mobile cart the stroller in FIG. 1 showing the foldable frame in a folded-out position before a caregiver lifts upwardly on the fold handle to unlock a pivot lock included in the frame-motion controller to free the base stabilizer and the base pusher to pivot relative to the rolling base so that the foldable frame can be moved to a folded-in position (corresponding to the collapsed-storage mode of the stroller) from the folded-out position (corresponding to the expanded-use mode of the stroller) as shown in FIGS. 3 and 4.
Figure 3:
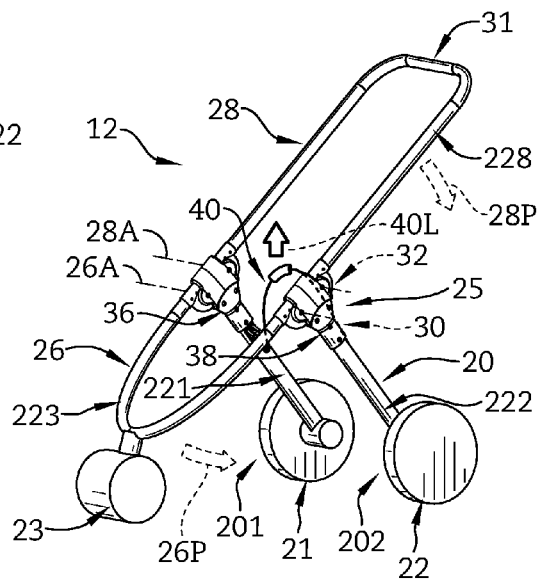
FIG. 3 is a view similar to FIG. 2 showing the mobile cart fold handle pulled upwardly so that the pivot lock included in the frame-motion controller is unlocked and foldable frame components are free to pivot relative to the rolling base such that the foldable frame can be moved to the folded-in position as shown in FIG. 4.
Figure 4:
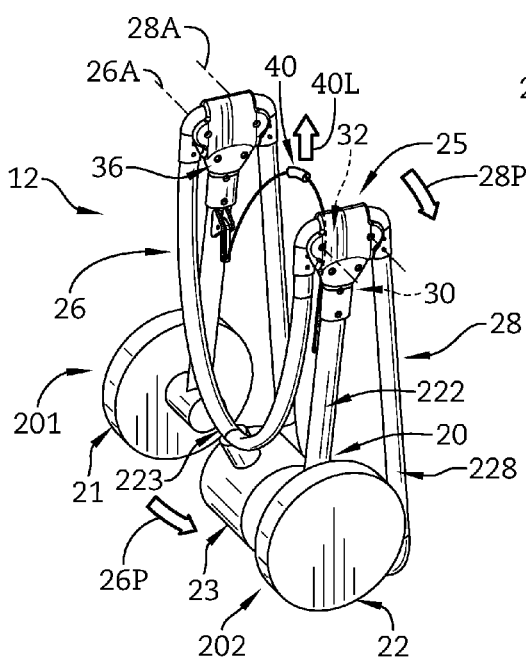
FIG. 4 is a view similar to FIGS. 2 and 3 showing the foldable frame moved to the folded-in position after the base stabilizer and the base pusher are pivoted relative to the rolling base about respective axes.

A compact collapsible stroller 10 in accordance with the present disclosure is shown in FIG. 1 and is adapted to move from an expanded-use mode to a collapsed-storage mode as shown in FIGS. 2-4. The stroller 10 illustratively includes a mobile cart 12 and a seat 14 coupled to mobile cart 12 as shown in FIG. 1. Mobile cart 12 of compact collapsible stroller 10 includes a rolling base 20, a foldable frame 24 mounted on rolling base 20, and a frame-motion controller 25. Frame-motion controller 25 allows a user to collapse the stroller 10 by folding the foldable frame 24 in toward the rolling base 20 using only one-hand to lift up on a fold handle 40 as suggested in FIGS. 1-4.

Rolling base 20 of the mobile cart 12 illustratively includes a left leg 201 and a right leg 202 as shown in FIG. 1. Each leg includes a corresponding left or right frame member 221, 222 and a corresponding left or right rear wheel 21, 22 as shown in FIG. 1. Frame members 221, 222 extend upwardly from the rear wheels 21, 22 and frame-motion controller 25 is coupled to the frame members 221, 222 opposite the rear wheels 21, 22.

Foldable frame 24 includes a base stabilizer 26 having a front wheel 23 and a base pusher 28 having a push handle 31 as shown in FIG. 1. Base stabilizer 26 is coupled to rolling base 20 for pivotable movement about a stabilizer-pivot axis 26A. Base pusher 28 is coupled to rolling base 20 for movement about a pusher-pivot axis 28A that is arranged to lie in spaced-apart relation stabilizer-pivot axis 26A. Base stabilizer 26 and base pusher 28 of the foldable frame 24 are arranged to move relative to rolling base 20 as suggested by arrows 26P, 28P from a folded-out position (corresponding to the expanded-use mode of stroller 10) shown in FIG. 2 to a folded-in position (corresponding to the collapsed-storage mode of stroller 10) shown in FIG. 4.

In the folded-out position, the base stabilizer 26 and the base pusher 28 extend away from the rolling base 20 to support a child sitting on a seat mounted to the mobile cart when the mobile cart is in use as shown, for example, in FIGS. 1-3 and 12. In the folded-in position, the base stabilizer 26 and the base pusher 28 extend along the rolling base 20 reducing the footprint of the mobile cart 12 to allow storage of the mobile cart 12 and the stroller 10 as shown in FIGS. 4 and 13.

Frame-motion controller 25 is illustratively adapted to provide fold means (1) for releasing foldable frame 24 to move from a folded-out position in which base stabilizer 26 and base pusher 28 extend away from rolling base 20 to support a child sitting on a seat mounted to mobile cart 12 when mobile cart 12 is in use to a folded-in position in which base stabilizer 26 and base pusher 28 extend along rolling base 20 reducing the footprint of mobile cart 12 to allow storage of mobile cart 12 and stroller 10 in response to a user lifting upwardly with one hand on fold handle 40 included in frame-motion controller 25 and (2) for coordinating movement of base stabilizer 26 included in foldable frame 24 and base pusher 28 included in foldable frame 24 as they move from the folded-out position to the folded-in position in response to continued upward lifting of fold handle 40 with one hand by a user that causes a gravitational force to pull base stabilizer 26 and base pusher 28 of foldable frame 24 toward the folded-in position so that a user can move foldable frame 24 from the folded-out position to the folded-in position for storage using only a first hand freeing a second hand to carry a child.

Figures 5A, 5B:
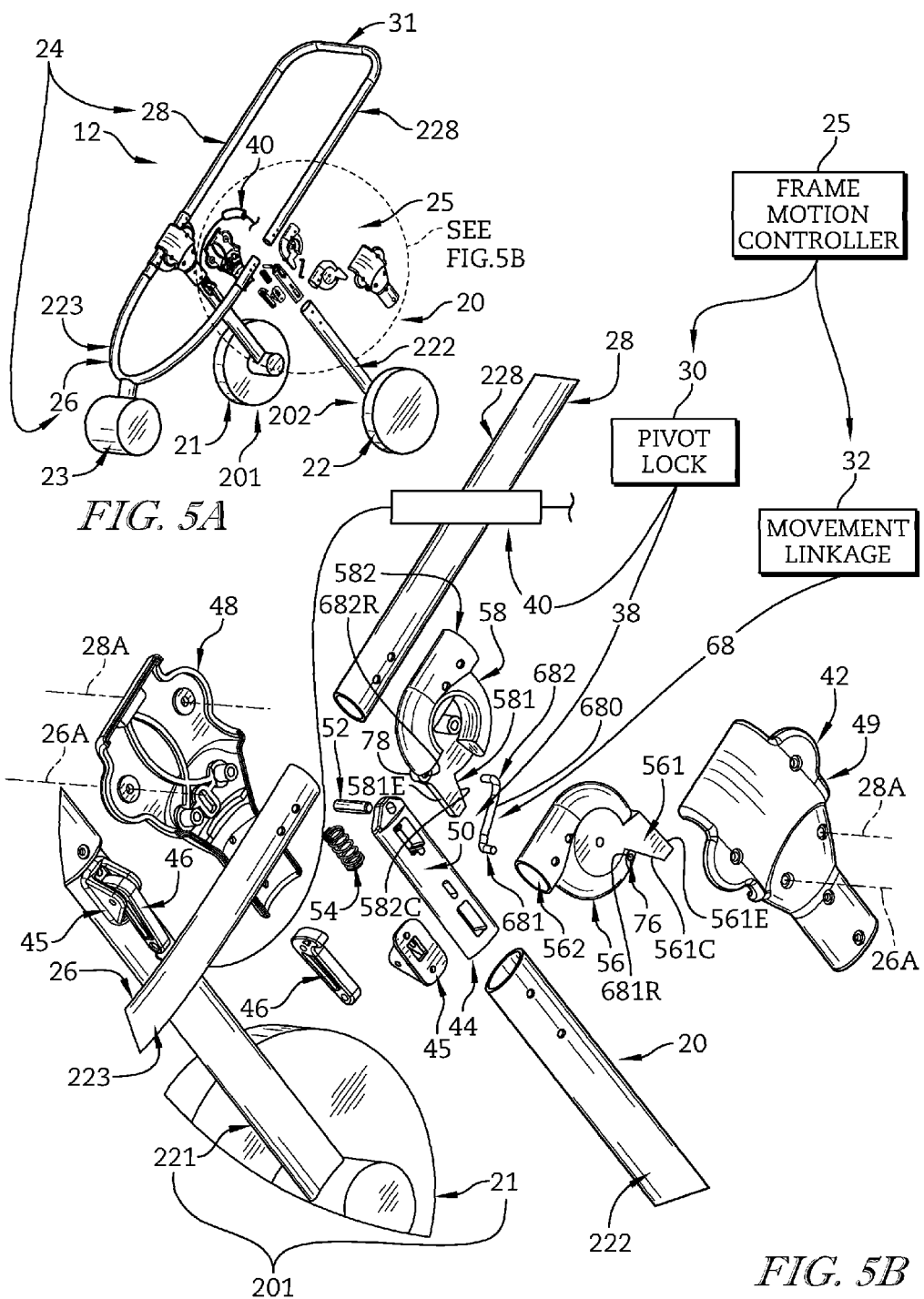
FIG. 5A is a perspective view of the mobile cart with a portion of the mobile cart exploded to show the components of the frame-motion controller along a right side of the mobile cart as shown in more detail in FIG. 5B.
FIG. 5B is a detailed exploded perspective view of a portion of the mobile cart showing that the frame-motion controller includes the pivot lock for freeing the foldable frame components to move about their respective axes and a movement linkage that coordinates movement of the frame components about their respective pivot axes, showing that a left locking unit of the pivot lock includes a housing coupled to the rolling base, a motion blocker mounted in the housing to slide within the housing between a locked and an unlocked position, and a lever pivotably mounted to the rolling base to push the motion blocker from the locked position to the unlocked position when a caregiver lifts upwardly on the fold handle, and showing that a left middle motion-transfer link included in the movement linkage of the frame-motion controller is adapted to be coupled to the base stabilizer and the base pusher to coordinate movement of the base stabilizer and the base pusher during motion of the foldable frame between the folded-out position and the folded-in position.

In the illustrative embodiment, frame-motion controller 25 includes a pivot lock 30 and a movement linkage 32 that interconnects the base stabilizer 26 and the base pusher 28 during movement of the foldable frame 24 as shown in FIG. 5B. Pivot lock 30 of the frame-motion controller 25 blocks or allows movement of the foldable frame 24 from the folded-out position to the folded-in position. Movement linkage 32 of frame-motion controller 25 coordinates movement of the base stabilizer 26 and the base pusher 28 during motion of the foldable frame 24 between the folded-out position to the folded-in position.

Pivot lock 30 illustratively includes left and right locking units 36, 38 and a fold handle 40 that extends between and interconnects the locking units 36, 38 as shown in FIG. 1. Left locking unit 36 is coupled to left leg 221 of the rolling base 20 and is arranged along a left side of the mobile cart 12. Right locking unit 38 is coupled to right leg 222 of the rolling base 20 and is arranged along a right side of the mobile cart 12. Fold handle 40 is illustratively a flexible band or strip of material that extends through the seat 14. Fold handle 40 is accessible to a caregiver when a child is not supported in seat 14. When a caregiver pulls fold handle 40 upwardly as suggested by arrow 40U, pivot lock 30 moves from a locked mode to an unlocked mode to allow movement of the foldable frame 24 from the folded-out position to the folded-in position.

Figure 14:
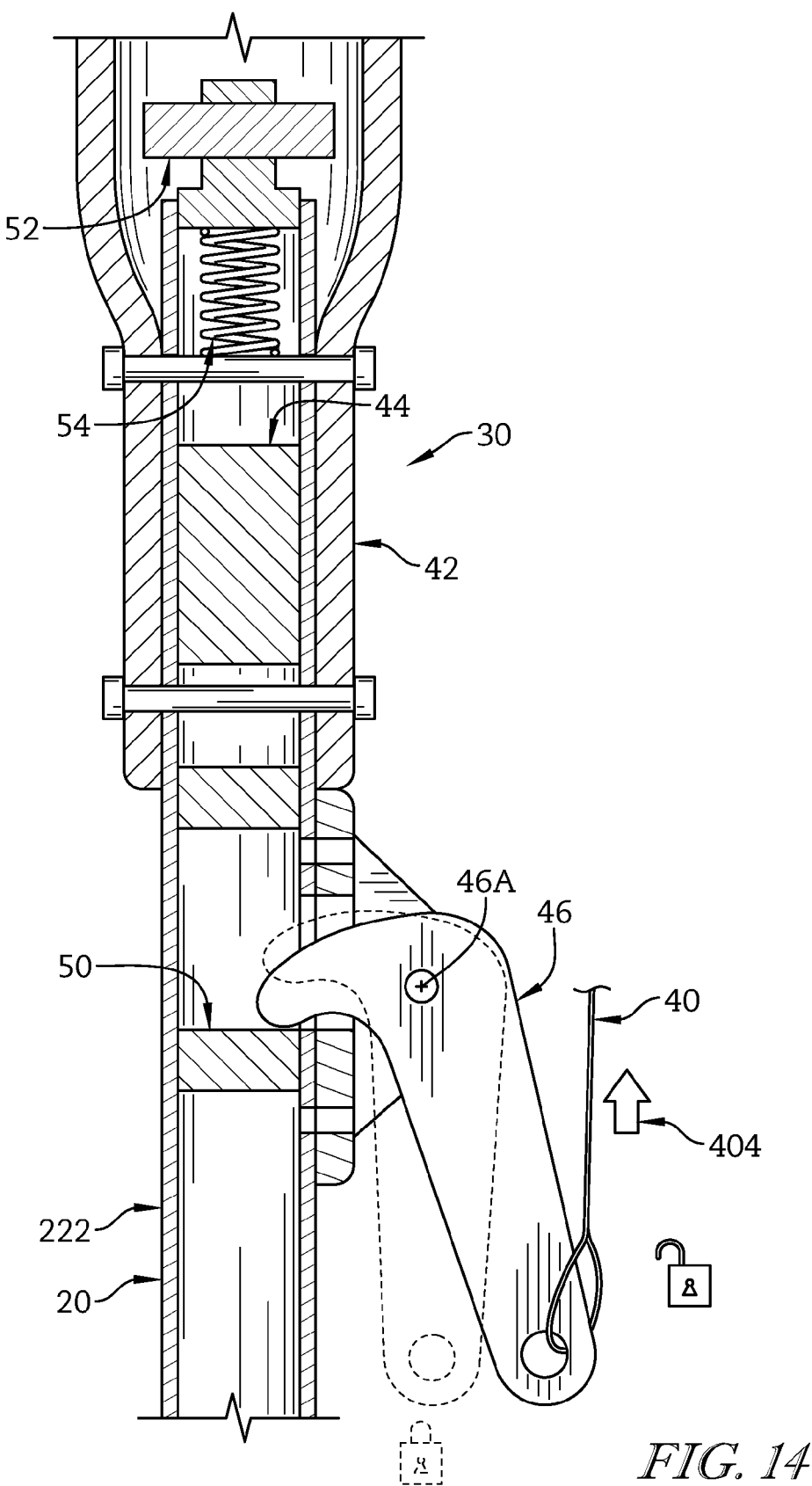
FIG. 14 is a partial cross-sectional view of FIG. 8 taken along line 14-14 showing the lever included in the left locking unit of the pivot lock pivoted to push the motion blocker in response to a caregiver pulling upwardly on the fold handle so that the pivot lock is in the unlocked position.

Each locking unit 36, 38 of pivot lock 30 is substantially similar and right locking unit 38 shown in FIG. 5B is representative of left locking unit 36. Locking unit 38 includes a housing 42, a motion blocker 44, and a lever 46 as shown in FIG. 5B. Housing 42 includes an inner shell 48 and an outer shell 49 and is coupled to rolling base 20. Motion blocker 44 is mounted in housing 42 to slide within housing 42 as suggested in FIG. 14. Lever 46 is coupled to fold handle 40 of pivot lock 30 and is mounted to rolling base 20 to pivot when a caregiver pulls fold handle 40 upwardly.

Motion blocker 44 slides between a first position shown in FIG. 6 and arranged to block the components 26, 28 of the foldable frame 24 from pivoting about their respective axes 26A, 28A and a second position shown in FIG. 10 and arranged to allow the components 26, 28 of the foldable frame 24 to pivot about their respective axes 26A, 28A. Motion blocker 44 illustratively includes a slide 50, a blocker pin 52, and a bias spring 54 as shown in FIG. 5B. Slide 50 is mounted in housing 42 and partially in corresponding right leg 222 of rolling base 20 to slide therein. Slide 50 also supports blocker pin 52. Blocker pin 52 is arranged to block fingers (sometimes called tabs) 561, 581 of pivot hubs 56, 58 included in base stabilizer 26 and base pusher 28, respectively, when motion blocker 44 is in the first position. Bias spring 54 is arranged to act between housing 42 and slide 50 to bias motion blocker 44 toward the first position blocking components 26, 28 of the foldable frame 24 from pivoting.

Lever 46 is coupled to rolling base 20 by a bracket 45 to pivot about a lever-pivot axis 46A as shown in FIG. 5B. Lever 46 engages slide 50 of motion blocker 44 to push motion blocker 44 to the second position arranged to allow the components 26, 28 of foldable frame 24 to pivot when a user pulls fold handle 40 upwardly as suggested in FIG. 14.

Movement linkage 32 of frame-motion controller 25 includes left and right middle motion-transfer links 66, 68 that couple base stabilizer 26 and base pusher 28 as suggested in FIG. 5B. The left and right middle motion-transfer links 66, 68 are configured to coordinate movement of base stabilizer 26 and base pusher 28 during motion of foldable frame 24 between the folded-out position and the folded-in position as suggested in FIGS. 7, 9, and 11.

Each middle motion-transfer link 66, 68 of movement linkage 32 is pivotably coupled to a stabilizer-link support 76 included in pivot hub 56 of base stabilizer 26 and to a pusher-link support 78 included in pivot hub 58 of base pusher 28. The stabilizer-link support 76 is offset from the stabilizer-pivot axis 26A about which base stabilizer 26 pivots relative to rolling base 20 and pusher-link support 78 is offset from the pusher-pivot axis 28A about which base pusher 28 pivots relative to rolling base 20. Each middle motion-transfer link 66, 68 of movement linkage 32 is illustratively a generally z-shaped rod with ends 681, 682 received in a stabilizer-link support 76 and in a pusher-link support 78 for rotative bearing engagement therewith.

Seat 14 is illustratively made from fabric stretched across a frame as suggested in FIG. 1. Seat 14 includes a seat bottom 15 and a seat back 16. Fold handle 40 extends through the seat 14 at the intersection of seat bottom 15 and seat back 16 so that fold handle 40 is available to caregivers when a child is not supported on seat 14 of stroller 10.

Rolling base 20 in the illustrative embodiment has two spaced-apart, generally straight legs 201, 202 as shown in FIG. 1. In some embodiments, a cross-member may extend between legs 201, 202. In addition, a brake system may be integrated into each rear wheel 21, 22 or more generally into rolling base 20.

Base stabilizer 26 of the foldable frame 24 illustratively includes a front wheel 23, a U-shaped stabilizer frame member 223, and pivot hubs 56 as suggested in FIGS. 5A and 5B. Front wheel 23 is coupled to U-shaped stabilizer frame member 223 at the apex of frame member 223 and is arranged to engage ground underlying collapsible stroller 10. U-shaped frame member 223 extends between left and right pivot hubs 56 and provides a footrest for a child seated on collapsible stroller 10. In some embodiments, base stabilizer 26 may include two or more wheels.

Each of the left and the right pivot hubs 56 included in the base stabilizer 26 is coupled to a corresponding housing 42 for rotation about axis 26A as shown in FIG. 1. Each pivot hub 56 is formed to include a finger 561 and a stabilizer frame receiver 562 as shown in FIGS. 5B and 6-11. Each finger 561 extends away from the stabilizer frame member 223 and is engaged by the motion blockers of the corresponding left and right pivot locks 36, 38 to block rotation of base stabilizer 26 relative to rolling base 20 when foldable frame 24 is in the folded-out position and motion blockers 44 of left and right pivot locks 36, 38 are in the locked position. Each stabilizer frame receiver 562 receives a portion of the stabilizer frame member 223 to couple the left and the right pivot hubs 56 to the stabilizer frame member 223.

In the illustrative embodiment, fingers 561 of pivot hubs 56 included in base stabilizer 26 are shaped to move left and right pivot locks 36, 38 to the unlocked position during expansion of collapsible stroller 10 so that a user need not lift fold handle 40 when unfolding foldable frame 24. In the exemplary embodiment, fingers 561 of pivot hubs 56 are formed to include an engagement surface 561E and a cam surface 561C as shown in FIG. 5B.

Engagement surface 561E of each of finger 561 is arranged to extend at a right angle from stabilizer frame member 223 and to be engaged by motion blockers 44 of corresponding left and right pivot locks 36, 38 to block rotation of base stabilizer 26 relative to rolling base 20 when foldable frame 24 is in the folded-out position and motion blockers 44 of left and the right pivot locks 36, 38 are in the locked position. Cam surface 561C of each of fingers 561 included in base stabilizer 26 are arranged to extend at an obtuse cam angle from stabilizer frame member 223 and to push pins 52 of motion blockers 44 included in pivot locks 36, 38 from the locked position to the unlocked position during movement of foldable frame 24 from the folded-in position to the folded-out position.

Base pusher 28 of foldable frame 24 illustratively includes a U-shaped pusher frame member 228 and pivot hubs 58 as suggested in FIGS. 5A and 5B. U-shaped pusher frame member 228 extends between left and right pivot hubs 58 and forms the push handle 31 of stroller 10 which is adapted to be pushed by a caregiver driving collapsible stroller 10.

Each of the left and the right pivot hubs 58 included in the base pusher 28 is coupled to a corresponding housing 42 for rotation about axis 28A as shown in FIG. 1. Each pivot hub 58 is formed to include a finger 581 and a pusher frame receiver 582 as shown in FIGS. 5B and 6-11. Each finger 581 extends away from the pusher frame member 228 and is engaged by motion blockers 44 of the corresponding left and right pivot locks 36, 38 to block rotation of base pusher 28 relative to rolling base 20 when foldable frame 24 is in the folded-out position and motion blockers 44 of left and right pivot locks 36, 38 are in the locked position. Each pusher frame receiver 582 receives a portion of the pusher frame member 228 to couple the left and the right pivot hubs 58 to the pusher frame member 228.

In the illustrative embodiment, fingers 581 of pivot hubs 58 included in base pusher 28 are shaped to move left and right pivot locks 36, 38 to the unlocked position during expansion of collapsible stroller 10 so that a user need not lift fold handle 40 when unfolding foldable frame 24. In the exemplary embodiment, fingers 581 of pivot hubs 58 are formed to include an engagement surface 581E and a cam surface 581C as shown in FIG. 5B.

Engagement surface 581E of each of finger 581 is arranged to extend at a right angle from pusher frame member 228 and to be engaged by motion blockers 44 of corresponding left and right pivot locks 36, 38 to block rotation of base pusher 28 relative to rolling base 20 when foldable frame 24 is in the folded-out position and motion blockers 44 of left and the right pivot locks 36, 38 are in the locked position. Cam surface 581C of each of fingers 581 of pivot hubs 58 included in base pusher 28 is arranged to extend at an obtuse cam angle from pusher frame member 228 and to push pins 52 of motion blockers 44 included in pivot locks 36, 38 from the locked position to the unlocked position during movement of foldable frame 24 from the folded-in position to the folded-out position.

A folding stroller concept in accordance with the present disclosure provides a method of synchronizing the movement of the metal tubes 223, 228 as stroller 10 is folded and unfolded. The locking method includes a lock lever 46 that directly pushes on the lock slider 44. The smaller ends of the two lock lever parts 46 are connected by a cloth webbing strap 40. Pulling up on the cloth strap 40 has the effect of pulling the lower ends of the two lock levers 46 towards each other, which pulls the lock slider 44 down. Initially, the lock pin 52 in the lock slider 44 is between extended tabs 561, 581 on the lower parts of the hub front 56 and hub back 58, preventing them from moving towards each other, which locks the system in the open position. But when the lock slider 44 moves down, the lock pin 52 is free of this gap between the hubs 56, 58, and the stroller 10 is free to fold.

A mobile cart 12 is adapted in accordance with the present disclosure for use in a collapsible stroller 10 as suggested in FIG. 1. Mobile cart 12 includes a foldable frame 24 and a rolling base 20 supporting the foldable frame 24 and including a rear wheel 22 as suggested in FIGS. 1 and 5A. Foldable frame 24 includes a rolling-base stabilizer 26 having a front wheel 23 and a rolling-base pusher 28 having a push handle 31 as shown in FIGS. 1 and 5A. Rolling-base stabilizer 26 is coupled to rolling base 20 to pivot about a stabilizer-pivot axis 26A between a folded-in position arranged to lie in close proximity to the rolling base 20 as shown in FIGS. 4, 10, and 11 and a folded-out position arranged to extend forwardly away from the rolling base 20 as shown in FIGS. 1, 2, and 6. Rolling-base pusher 28 is coupled to rolling base 20 to pivot about a pusher-pivot axis 28A between a folded-in position arranged to lie in close proximity to the rolling base 20 as shown in FIGS. 4, 10, and 11 and a folded-out position arranged to extend upwardly away from rolling base 20 as shown in FIGS. 1, 2, and 6.

Mobile cart 12 also includes a frame-motion controller 25 as shown in FIGS. 1, 5A, and 5B. Frame-motion controller 25 includes a pivot lock 30 and movement-linkage means 32 for coordinating movement of the rolling-base stabilizer 26 and rolling-base pusher 28 relative to rolling base 20 as shown in FIGS. 2-4 and 6-11 so that the rolling-base stabilizer 26 and pusher 28 move simultaneously toward the rolling base 20 to the folded-in positions to establish a collapsed-storage mode (see FIG. 4) of the mobile cart 12 during movement of one of the rolling-base stabilizer 26 and pusher 28 toward the rolling base 20 and so that the rolling-base stabilizer 26 and pusher 28 move simultaneously away from the rolling base 20 to the folded-out positions to establish an alternative expanded-use storage mode (see FIG. 3) of the mobile cart 12 during movement of one of the rolling-base stabilizer 26 and pusher 28 away from the rolling base 20. The movement-linkage means 32 includes a middle motion-transfer link 68 having a first-end segment 681 mounted for pivotable movement in a first link-end receiver 681R formed in the rolling-base stabilizer 26 and a second-end segment 682 mounted for pivotable movement in a second link-end receiver 682R formed in the rolling-base pusher 28 as suggested in FIG. 5B and FIGS. 7, 9, and 11.

Middle motion-transfer link 68 is a rod comprising first-end segment 681, second-end segment 682, and a central segment 680 interconnecting first-end and second-end segments 681, 682 as shown in FIG. 5B. Central segment 680 is relatively longer than each of first-end and second-end segments 681, 682 as shown in FIG. 5B. First-end segment 681 is arranged to extend away from central segment 680 in a first direction and the second-end segment 682 is arranged to lie in spaced-apart relation to first-end segment 681 and extend away from central segment 680 in an opposite second direction as shown in FIG. 5B. Middle motion-transfer link 68 is a Z-shaped rod as shown in FIG. 5B.

Figures 8, 9:
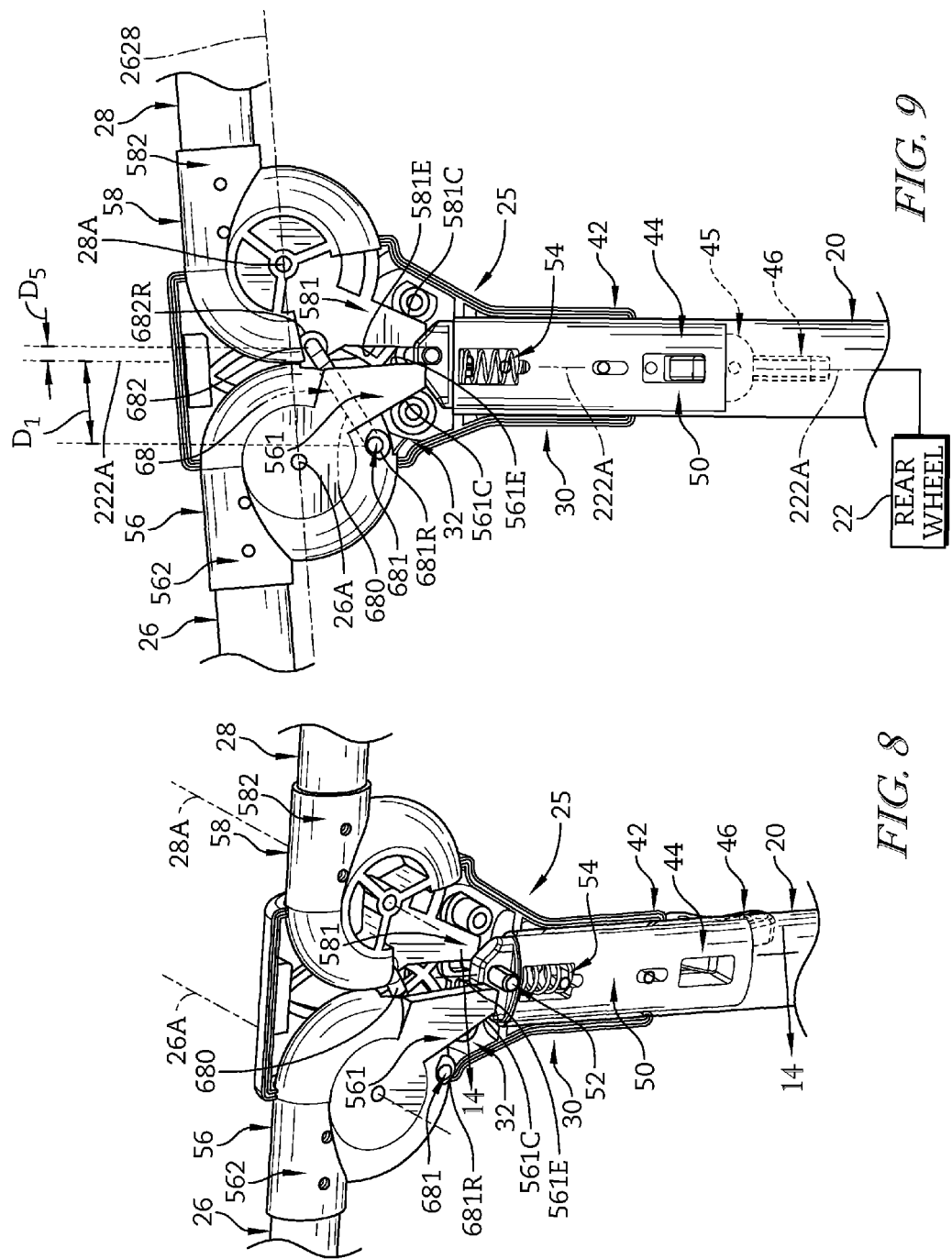
FIG. 8 is a perspective view of the left lock unit included in the pivot lock of the frame-motion controller corresponding to the mobile cart of FIG. 3 showing the motion blocker of the left lock unit moved to allow movement of the base stabilizer and the base pusher relative to the rolling base so that the foldable frame can be moved to the folded-in position from the folded-out position as shown in FIG. 10.
FIG. 9 is a side elevation view similar to FIG. 8 showing the movement linkage of the frame-motion controller corresponding to the mobile cart of FIG. 3 in which the movement linkage interconnects the base stabilizer and the base pusher prior to motion of the foldable frame to the folded-in position from the folded-out position as shown in FIG. 11.

A pivot-axis reference line 2628 intersects each of the stabilizer-pivot axis 26A and the pusher-pivot axis 28A as suggested in FIGS. 7, 9, and 11. First-end segment 681 of middle motion-transfer link 68 is arranged to lie at a first distance $d_1$ from pivot-axis reference line 2628 and second-end segment 682 of middle motion-transfer link 68 is arranged to lie at a relatively shorter second distance $d_2$ from pivot-axis reference line 2628 when each of the rolling-base stabilizer 26 and the rolling-base pusher 28 is in the folded-out position as shown in FIG. 7. First-end segment 681 of middle motion-transfer link 68 is arranged to lie at a third distance $d_3$ from pivot-axis reference line 2628 and second-end segment 682 of middle motion-transfer link 68 is arranged to lie at a relatively longer fourth distance $d_4$ from pivot-axis reference line 2628 when each of the rolling-base stabilizer 26 and the rolling-base pusher 28 is in the folded-in position as shown in FIG. 11.

Rolling-base stabilizer 26 and rolling-base pusher 28 are shown in the folded-out positions in FIGS. 9-12. First-end segment 681 of middle motion-transfer link 68 is arranged to lie between pivot-axis reference line 2628 and rear wheel 22 of rolling base 20 when each of the rolling-base stabilizer 26 and the rolling-base pusher 28 is in the folded-out position as suggested in FIGS. 9 and 12. Second-end segment 682 of middle motion-transfer link 68 is arranged to lie between pivot-axis reference line 2628 and first-end segment 681 of middle motion-transfer link 68 when each of the rolling-base stabilizer 26 and the rolling-base pusher 28 is in the folded-out position as suggested in FIGS. 9 and 12.

Rolling-base stabilizer 26 and rolling-base pusher 28 are shown in the folded-in positions in FIGS. 11 and 13. Pivot-axis reference line 2628 is arranged to lie between rear wheel 22 of rolling base 20 and first-end segment 681 of middle motion-transfer link 68 when each of the rolling-base stabilizer 26 and rolling-base pusher 28 is in the folded-in position as suggested in FIGS. 11 and 13. Pivot-axis reference line 2628 is arranged to lie between rear wheel 22 of rolling base 20 and second-end segment 682 of middle motion-transfer link 68 when each of the rolling-base stabilizer 26 and rolling-base pusher 28 is in the folded-in position as suggested in FIGS. 11 and 13. First-end segment 681 of middle motion-transfer link 68 is arranged to lie between pivot-axis reference line 2628 and second-end segment 682 of middle motion-transfer link 68 when each of the rolling-base stabilizer 26 and rolling-base pusher 28 is in the folded-in position.

Rolling-base stabilizer 26 further includes a front leg 223 associated with the front wheel 23 and a stabilizer pivot hub 56 coupled to the front leg 223 as suggested in FIG. 12. Stabilizer pivot hub 56 is formed to include the first link-end receiver 282R as shown in FIGS. 5B, 7, and 11. Stabilizer pivot hub 56 is mounted for pivotable movement on the rolling base 20 about the stabilizer-pivot axis 26A to locate the first link-end receiver 681R in spaced-apart relation to the stabilizer-pivot axis 26A as suggested in FIGS. 9 and 11.

Rolling base 20 includes a rear leg 222 associated with the rear wheel 22 and configured to define a longitudinally extending central axis 222A that passes through a space located between the stabilizer-pivot axis 26A and the pusher-pivot axis 28B as suggested in FIGS. 9 and 11. First-end segment 681 of middle motion-transfer link 68 remains in the first link-end receiver 681R in rotative bearing engagement with stabilizer pivot hub 56 during pivotable movement of stabilizer pivot hub 56 about the stabilizer-pivot axis 26A in response to movement of rolling-base stabilizer 26 relative to rolling base 20 between the folded-out position associated with the expanded use mode of the mobile cart 12 and the folded-in position associated with the collapsed storage mode of the mobile cart 12 as suggested in FIGS. 9 and 11.

First-end segment 681 of middle motion-transfer link 68 is arranged to lie at a first distance $D_1$ from the longitudinally extending central axis 222A of rolling base 20 when the rolling-base stabilizer 26 is in the folded-out position as suggested in FIG. 9. First-end segment 681 of middle motion-transfer link 68 is arranged to lie at a relatively shorter second distance $D_2$ from the longitudinally extending central axis 222A of rolling base 20 when the rolling-base stabilizer 26 is in the folded-in position as suggested in FIG. 11.

First-end segment 681 of middle motion-transfer link 68 is arranged to lie at a third distance $D_3$ from rear wheel 22 of the rolling base 20 when the rolling-base stabilizer 26 is in the folded-out position as suggested in FIG. 12. First-end segment 681 is arranged to lie at a relatively longer fourth distance $D_4$ from rear wheel 22 of rolling base 20 when the rolling-base stabilizer 26 is in the folded-in position as suggested in FIG. 13.

Rolling-base pusher 28 further includes a pusher pivot hub 58 coupled to the push handle 31 as shown in FIG. 1. Pivot pusher hub 58 is formed to include the second link-end receiver 682R as shown in FIG. 5B. Pusher pivot hub 58 is mounted for pivotable movement on rolling base 20 about the pusher-pivot axis 28A to locate the second link-end receiver 682R in spaced-apart relation to each of the pusher-pivot axis 28A and the first link-end receiver 681R as shown in FIGS. 9 and 11.

Second-end segment 682 of middle motion-transfer link 68 remains in the second link-end receiver 682R in rotative bearing engagement with pusher pivot hub 58 during pivotable movement of pusher pivot hub 58 about the base-pusher pivot axis 28A in response to movement of rolling-base pusher 28 relative to rolling base 20 between the folded-out position associated with the expanded use mode of the mobile cart 12 and the folded-in position associated with the collapsed storage mode of the mobile cart 12 as suggested in FIGS. 9 and 11. Second-end segment 682 of middle motion-transfer link 68 is arranged to lie at a fifth distance $D_5$ from the longitudinally extending central axis 222A of rolling base 20 when the rolling-base pusher 28 is in the folded-out position as shown in FIG. 9. Second-end segment 682 of middle motion-transfer link 68 is arranged to lie at a relatively longer sixth distance $D_6$ from the longitudinally extending central axis 222A of rolling base 20 when the rolling-base pusher 28 is in the folded-in position as shown in FIG. 11.

Second-end segment 682 of middle motion-transfer link 68 is arranged to lie at a seventh distance $D_7$ from rear wheel 22 of rolling base 20 when the rolling-base pusher 28 is in the folded-out position as suggested in FIG. 12. Second-end segment 682 is arranged to lie at a relatively longer eighth distance $D_8$ from rear wheel 22 of rolling base 20 when the rolling-base pusher 28 is in the folded-in position as suggested in FIG. 13.

The invention claimed is:

1. A mobile cart adapted for use in a collapsible stroller, the mobile cart comprising
    a rolling base including a rear wheel,
    a foldable frame including a rolling-base stabilizer having a front wheel and a rolling-base pusher having a push handle, the rolling-base stabilizer being coupled to the rolling base to pivot about a stabilizer-pivot axis between a folded-in position arranged to lie in close proximity to the rolling base and a folded-out position arranged to extend forwardly away from the rolling base, and the rolling-base pusher being coupled to the rolling base to pivot about a pusher-pivot axis between a folded-in position arranged to lie in close proximity to the rolling base and a folded-out position arranged to extend upwardly away from the rolling base, and a frame-motion controller including movement-linkage means for coordinating movement of the rolling-base stabilizer and base pusher relative to the rolling base so that the rolling-base stabilizer and pusher move simultaneously toward the rolling base to the folded-in positions to establish a collapsed-storage mode of the mobile cart during movement of one of the rolling-base stabilizer and pusher toward the rolling base and so that the rolling-base stabilizer and pusher move simultaneously away from the rolling base to the folded-out positions to establish an alternative expanded-use storage mode of the mobile cart during movement of one of the rolling-base stabilizer and pusher away from the rolling base, wherein the movement-linkage means includes a middle motion-transfer link having a first-end segment mounted for pivotable movement in a first link-end receiver formed in the rolling-base stabilizer and a second-end segment mounted for pivotable movement in a second link-end receiver formed in the rolling-base pusher.

2. The mobile cart of claim 1, wherein the middle motion-transfer link is a rod comprising the first-end segment, the second-end segment, and a central segment interconnecting the first-end and second-end segments.

3. The mobile cart of claim 2, wherein the central segment is relatively longer than each of the first-end and second-end segments.

4. The mobile cart of claim 3, wherein the first-end segment is arranged to extend away from the central segment in a first direction and the second-end segment is arranged to lie in spaced-apart relation to the first-end segment and extend away from the central segment in an opposite second direction.

5. The mobile cart of claim 2, wherein the middle motion-transfer link is a Z-shaped rod.

6. The mobile cart of claim 1, wherein a pivot-axis reference line intersects each of the stabilizer-pivot axis and the pusher-pivot axis, the first-end segment of the middle motion-transfer link is arranged to lie at a first distance from the pivot-axis reference line and the second-end segment of the middle motion-transfer link is arranged to lie at a relatively shorter second distance from the pivot-axis reference line when each of the rolling-base stabilizer and the rolling-base pusher is in the folded-out position, and the first-end segment of the middle motion-transfer link is arranged to lie at a third distance from the pivot-axis reference line and the second-end segment of the middle motion-transfer link is arranged to lie at a relatively longer fourth distance from the pivot-axis reference line when each of the rolling-base stabilizer and the rolling-base pusher is in the folded-in position.

7. The mobile cart of claim 6, wherein the first-end segment of the middle motion-transfer link is arranged to lie between the pivot-axis reference line and the rear wheel of the rolling base when each of the rolling-base stabilizer and the rolling-base pusher is in the folded-out position.

8. The mobile cart of claim 7, wherein the second-end segment of the middle motion-transfer link is arranged to lie between the pivot-axis reference line and the first-end segment of the middle motion-transfer link when each of the rolling-base stabilizer and the rolling-base pusher is in the folded-out position.

9. The mobile cart of claim 7, wherein the pivot-axis reference line is arranged to lie between the rear wheel of the rolling base and the first-end segment of the middle motion-transfer link when each of the rolling-base stabilizer and rolling-base pusher is in the folded-in position.

10. The mobile cart of claim 9, wherein the second-end segment of the middle motion-transfer link is arranged to lie at a seventh distance from the rear wheel of the rolling base when the rolling-base pusher is in the folded-out position and at a relatively longer eighth distance from the rear wheel of the rolling base when the rolling-base pusher is in the folded-in position.

11. The mobile care of claim 7, wherein the pivot-axis reference line is arranged to lie between the rear wheel of the rolling base and the second-end segment of the middle motion-transfer link when each of the rolling-base stabilizer and rolling-base pusher is in the folded-in position.

12. The mobile cart of claim 7, wherein the first-end segment of the middle motion-transfer link is arranged to lie between the pivot-axis reference line and the second-end segment of the middle motion-transfer link when each of the rolling-base stabilizer and rolling-base pusher is in the folded-in position.

13. The mobile cart of claim 1, wherein the rolling-base stabilizer further includes a front leg associated with the front wheel and a stabilizer pivot hub coupled to the front leg and formed to include the first link-end receiver and the stabilizer pivot hub is mounted for pivotable movement on the rolling base about the stabilizer-pivot axis to locate the first link-end receiver in spaced-apart relation to the stabilizer-pivot axis.

14. The mobile cart of claim 13, wherein the rolling base includes a rear leg associated with the rear wheel and configured to define a longitudinally extending central axis that passes through a space located between the stabilizer-pivot axis and the pusher-pivot axis, the first-end segment of the middle motion-transfer link remains in the first link-end receiver in rotative bearing engagement with the stabilizer pivot hub during pivotable movement of the stabilizer pivot hub about the stabilizer-pivot axis in response to movement of the rolling-base stabilizer relative to the rolling base between the folded-out position associated with the expanded use mode of the mobile cart and the folded-in position associated with the collapsed storage mode of the mobile cart, the first-end segment of the middle motion-transfer link is arranged to lie at a first distance from the longitudinally extending central axis of rolling base when the rolling-base stabilizer is in the folded-out position, and the first-end segment of the middle motion-transfer link is arranged to lie at a relatively shorter second distance from the longitudinally extending central axis of the rolling base when the rolling-base stabilizer is in the folded-in position.

15. The mobile cart of claim 14, wherein the first-end segment of the middle motion-transfer link is arranged to lie at a third distance from the rear wheel of the rolling base when the rolling-base stabilizer is in the folded-out position and at a relatively longer fourth distance from the rear wheel of the rolling base when the rolling-base stabilizer is in the folded-in position.

16. The mobile cart of claim 14, wherein the rolling-base pusher further includes a pusher pivot hub coupled to the push handle and formed to include the second link-end receiver and the pusher pivot hub is mounted for pivotable movement on the rolling base about the pusher-pivot axis to locate the second link-end receiver in spaced-apart relation to each of the pusher-pivot axis and the first link-end receiver.

17. The mobile cart of claim 16, wherein the second-end segment of the middle motion-transfer link remains in the second link-end receiver in rotative bearing engagement with the pusher pivot hub during pivotable movement of the pusher pivot hub about the base-pusher pivot axis in response to movement of the rolling-base pusher relative to the rolling base between the folded-out position associated with the expanded use mode of the mobile cart and the folded-in position associated with the collapsed storage mode of the mobile cart, the second-end segment of the middle motion-transfer link is arranged to lie at a fifth distance from the longitudinally extending central axis of the rolling base when the rolling-base pusher is in the folded-out position, and the second-end segment of the middle motion-transfer link is arranged to lie at a relatively longer sixth distance from the longitudinally extending central axis of the rolling base when the rolling-base pusher is in the folded-in position.

\* \* \* \* \*